US007837554B2

(12) United States Patent
Kaminkow et al.

(10) Patent No.: US 7,837,554 B2
(45) Date of Patent: *Nov. 23, 2010

(54) GAMING DEVICE HAVING A MULTIPLE SELECTION AND AWARD DISTRIBUTION BONUS SCHEME

(75) Inventors: Joseph E. Kaminkow, Reno, NV (US); Randall D. Mead, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 145 days.

This patent is subject to a terminal disclaimer.

(21) Appl. No.: 11/620,381

(22) Filed: Jan. 5, 2007

(65) Prior Publication Data

US 2007/0129131 A1 Jun. 7, 2007

Related U.S. Application Data

(63) Continuation of application No. 10/459,809, filed on Jun. 12, 2003, now Pat. No. 7,160,188, which is a continuation of application No. 09/688,635, filed on Oct. 16, 2000, now Pat. No. 6,599,185.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/25; 463/16; 463/20; 463/42; 463/43; 273/138.1; 273/143 R; 273/274

(58) Field of Classification Search .................. 463/11, 463/12, 13, 17, 18, 19, 20, 40, 42, 22

See application file for complete search history.

(56) References Cited

U.S. PATENT DOCUMENTS

| | | | |
|---|---|---|---|
| 1,527,929 | A | 2/1925 | Simons |
| 4,335,809 | A | 6/1982 | Wain |
| 4,560,161 | A | 12/1985 | Hamano |
| 4,582,324 | A | 4/1986 | Koza et al. |

(Continued)

FOREIGN PATENT DOCUMENTS

| | | |
|---|---|---|
| EP | 0122138 | 4/1984 |

(Continued)

OTHER PUBLICATIONS

Winning Bid Brochure written by WMS Gaming, Inc., published prior to 2000.

(Continued)

*Primary Examiner*—John M. Hotaling, II
*Assistant Examiner*—Paul A. D'Agostino
(74) *Attorney, Agent, or Firm*—K&L Gates LLP

(57) ABSTRACT

A gaming device having a multiple selection and award distribution bonus scheme. A selection is chosen from a group of selections. The game determines awards for distribution to the selection. Once determined, the awards are distributed to the selection and a player is provided with the awards. The game preferably utilizes a number of award pools in order to determine the award distribution. This award pool determination is based on, for example, a number of probability tables associated with the award pools.

23 Claims, 11 Drawing Sheets

U.S. PATENT DOCUMENTS

| | | | | |
|---|---|---|---|---|
| 4,648,600 | A | | 3/1987 | Olliges |
| 4,652,998 | A | | 3/1987 | Koza et al. |
| 4,695,053 | A | | 9/1987 | Vazquez, Jr. et al. |
| 4,856,787 | A | | 8/1989 | Itkis |
| 5,074,559 | A | * | 12/1991 | Okada ..... 463/21 |
| 5,265,877 | A | * | 11/1993 | Boylan et al. ..... 273/139 |
| 5,324,035 | A | | 6/1994 | Morris et al. |
| 5,326,104 | A | | 7/1994 | Pease et al. |
| 5,380,008 | A | * | 1/1995 | Mathis et al. ..... 463/18 |
| 5,401,023 | A | * | 3/1995 | Wood ..... 463/13 |
| 5,456,465 | A | | 10/1995 | Durham |
| 5,494,294 | A | * | 2/1996 | Cappetta ..... 273/269 |
| 5,511,784 | A | * | 4/1996 | Furry et al. ..... 273/143 R |
| 5,542,669 | A | | 8/1996 | Charron et al. |
| 5,639,088 | A | * | 6/1997 | Schneider et al. ..... 273/138.2 |
| 5,655,961 | A | | 8/1997 | Acres et al. |
| 5,725,428 | A | * | 3/1998 | Achmuller ..... 463/20 |
| 5,741,183 | A | | 4/1998 | Acres et al. |
| 5,752,882 | A | | 5/1998 | Acres et al. |
| 5,779,545 | A | | 7/1998 | Berg et al. |
| 5,788,573 | A | | 8/1998 | Baerlocher et al. |
| 5,800,269 | A | | 9/1998 | Holch et al. |
| 5,816,918 | A | * | 10/1998 | Kelly et al. ..... 463/16 |
| 5,820,459 | A | * | 10/1998 | Acres et al. ..... 463/25 |
| 5,836,817 | A | | 11/1998 | Acres et al. |
| 5,851,147 | A | | 12/1998 | Stupak et al. |
| 5,871,398 | A | * | 2/1999 | Schneier et al. ..... 463/16 |
| 5,876,284 | A | | 3/1999 | Acres et al. |
| 5,882,259 | A | | 3/1999 | Holmes, Jr. et al. |
| 5,947,820 | A | | 9/1999 | Morro et al. |
| 6,001,016 | A | | 12/1999 | Walker et al. |
| 6,015,346 | A | | 1/2000 | Bennett |
| 6,024,640 | A | * | 2/2000 | Walker et al. ..... 463/17 |
| 6,059,658 | A | * | 5/2000 | Mangano et al. ..... 463/16 |
| 6,062,980 | A | * | 5/2000 | Luciano ..... 463/20 |
| 6,077,162 | A | * | 6/2000 | Weiss ..... 463/26 |
| 6,082,887 | A | * | 7/2000 | Feuer et al. ..... 700/91 |
| 6,089,976 | A | | 7/2000 | Schneider et al. |
| 6,099,408 | A | | 8/2000 | Schneier et al. |
| 6,102,798 | A | | 8/2000 | Bennett |
| 6,113,495 | A | * | 9/2000 | Walker et al. ..... 463/42 |
| 6,126,542 | A | | 10/2000 | Fier |
| 6,142,874 | A | * | 11/2000 | Kodachi et al. ..... 463/20 |
| 6,146,273 | A | | 11/2000 | Olsen |
| 6,159,096 | A | | 12/2000 | Yoseloff |
| 6,159,097 | A | | 12/2000 | Gura |
| 6,159,098 | A | | 12/2000 | Slomiany et al. |
| 6,162,121 | A | | 12/2000 | Morro et al. |
| 6,162,122 | A | | 12/2000 | Acres et al. |
| 6,168,520 | B1 | | 1/2001 | Baerlocher et al. |
| 6,174,235 | B1 | | 1/2001 | Walker et al. |
| 6,183,361 | B1 | * | 2/2001 | Cummings et al. ..... 463/18 |
| 6,217,448 | B1 | * | 4/2001 | Olsen ..... 463/25 |
| 6,231,445 | B1 | | 5/2001 | Acres |
| 6,244,958 | B1 | | 6/2001 | Acres |
| 6,254,483 | B1 | | 7/2001 | Acres |
| 6,257,981 | B1 | | 7/2001 | Acres et al. |
| 6,311,976 | B1 | * | 11/2001 | Yoseloff et al. ..... 273/138.2 |
| 6,312,333 | B1 | | 11/2001 | Acres |
| 6,319,125 | B1 | | 11/2001 | Acres |
| 6,364,766 | B1 | | 4/2002 | Anderson et al. |
| 6,364,768 | B1 | | 4/2002 | Acres et al. |
| 6,371,852 | B1 | | 4/2002 | Acres |
| 6,375,567 | B1 | | 4/2002 | Acres |
| 6,375,569 | B1 | | 4/2002 | Acres |
| 6,398,218 | B1 | | 6/2002 | Vancura |
| 6,419,583 | B1 | | 7/2002 | Crumby et al. |
| 6,431,983 | B2 | | 8/2002 | Acres |
| 6,454,649 | B1 | | 9/2002 | Mattice et al. |
| 6,537,150 | B1 | | 3/2003 | Luciano et al. |
| 6,565,434 | B1 | | 5/2003 | Acres |
| 6,592,457 | B1 | | 7/2003 | Frohm et al. |
| 6,599,185 | B1 | | 7/2003 | Kaminkow et al. |
| 6,607,438 | B2 | | 8/2003 | Baerlocher et al. |
| 6,648,757 | B1 | * | 11/2003 | Slomiany et al. ..... 463/20 |
| 6,656,048 | B2 | * | 12/2003 | Olsen ..... 463/25 |
| 6,702,668 | B2 | * | 3/2004 | Banyai ..... 463/17 |
| 6,712,697 | B2 | | 3/2004 | Acres |
| 6,733,385 | B1 | * | 5/2004 | Enzminger et al. ..... 463/17 |
| 6,800,030 | B2 | | 10/2004 | Acres |
| 6,832,958 | B2 | | 12/2004 | Acres et al. |
| 6,910,964 | B2 | | 6/2005 | Acres |
| 6,935,952 | B2 | * | 8/2005 | Walker et al. ..... 463/25 |
| 6,988,946 | B2 | | 1/2006 | Michaelson et al. |
| 7,056,215 | B1 | * | 6/2006 | Olive ..... 463/27 |
| 7,192,348 | B2 | * | 3/2007 | Brosnan et al. ..... 463/20 |
| 7,329,187 | B1 | * | 2/2008 | Holch et al. ..... 463/42 |
| 2002/0093190 | A1 | | 7/2002 | Katz |
| 2003/0083943 | A1 | * | 5/2003 | Adams et al. ..... 705/14 |
| 2003/0190943 | A1 | * | 10/2003 | Walker et al. ..... 463/17 |
| 2004/0166942 | A1 | * | 8/2004 | Muir ..... 463/43 |
| 2004/0176167 | A1 | | 9/2004 | Michaelson et al. |
| 2004/0224770 | A1 | | 11/2004 | Wolf et al. |
| 2006/0079331 | A1 | * | 4/2006 | Moshal ..... 463/42 |
| 2006/0143085 | A1 | * | 6/2006 | Adams et al. ..... 705/14 |
| 2008/0081691 | A1 | * | 4/2008 | Baerlocher et al. ..... 463/27 |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0984409 | A2 | 3/2000 |
| GB | 2098778 | | 11/1982 |
| GB | 2139390 | | 11/1984 |
| GB | 2151054 | | 7/1985 |
| WO | 9835309 | | 8/1998 |
| WO | WO 00/12186 | | 3/2000 |
| WO | 0067424 | | 11/2000 |
| WO | 0158550 | | 8/2001 |

OTHER PUBLICATIONS

Haywire Web Site Description written by IGT, published prior to 2000.

Punch-a-Bunch/The Punch Board, [http://gscentral.net/punch.htm], pp. 1-6.

Richard M. Bueschel, Lemons, Cherries and Bell-Fruit-Gum, Royal Bell Books, Denver, CO 1955, pp. 127-128.

* cited by examiner

FIG.10A

| | FIRST AWARD POOL (166) | SECOND AWARD POOL (168) | THIRD AWARD POOL (170) |
|---|---|---|---|
| PREDETERMINED NUMBER OF AWARDS 172 | 172a 4 | 172b 4 | 172c 2 |
| ASSIGN AWARDS TO AWARD POOLS 174 | 174a DEAC | 174b IHFG | 174c BJ |
| NUMBER RANGE OF AWARDS FOR DISTRIBUTION 176 | 176a 2-4 | 176b 1-4 | 176c 0-2 |
| AWARD RANGE 178 | 178a 2-10 | 178b 12-25 | 178c 30-100 |
| DETERMINATION OF AWARDS FOR DISTRIBUTION 180 | 180a DE | 180b I | 180c B |
| AWARDS FOR DISTRIBUTION 182 | 182a 4 | 182b 20 | 182c 30 |

FIG.10B

FIRST AWARD POOL

| NUMBER OF AWARDS FOR DISTRIBUTION (184) | DISTRIBUTION PROBABILITY (186) |
|---|---|
| 2 184a | 40% 186a |
| 3 184b | 30% 186b |
| 4 184c | 30% 186c |

FIG.10C

SECOND AWARD POOL

| NUMBER OF AWARDS FOR DISTRIBUTION (188) | DISTRIBUTION PROBABILITY (190) |
|---|---|
| 1 (188a) | 20% (190a) |
| 2 (188b) | 50% (190b) |
| 3 (188c) | 20% (190c) |
| 4 (188d) | 10% (190d) |

FIG.10D

THIRD AWARD POOL

| NUMBER OF AWARDS FOR DISTRIBUTION (192) | DISTRIBUTION PROBABILITY (194) |
|---|---|
| 0 (192a) | 50% (194a) |
| 1 (192b) | 25% (194b) |
| 2 (192c) | 25% (194c) |

GAMING DEVICE HAVING A MULTIPLE SELECTION AND AWARD DISTRIBUTION BONUS SCHEME

PRIORITY CLAIM

This application is a continuation of and claims the benefit of and priority to U.S. patent application Ser. No. 10/459,809, filed Jun. 12, 2003, which is a continuation of U.S. patent application Ser. No. 09/688,635, filed Oct. 16, 2000, now U.S. Pat. No. 6,599,185, the entire contents of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device including a selection and multiple award distribution bonus scheme.

BACKGROUND

Many existing gaming machines, such as, traditional slot machines, include bonus schemes. Typically, a bonus round of the bonus scheme begins when a player reaches a bonus triggering event in the primary game of the gaming device. In slot machines that employ reels, the triggering event generally occurs when the player reaches a predetermined combination of symbols on the reels. In general, the bonus round provides the player with an opportunity to gain and accumulate a bonus value, award or prize before the bonus round ends or terminates.

To increase player enjoyment and excitement, it is desirable to provide players with gaming devices having new bonus schemes.

SUMMARY

The present invention provides a gaming device and method which includes a group of selections and a plurality of awards distributed to the selections. The player chooses or selects one of the selections and the game distributes the awards to all of the selections. The player receives the awards distributed to the player's selection. The game randomly determines which awards are distributed to the selections.

In one preferred embodiment, the present invention utilizes a number of award pools to randomly determine the awards distributed to the player. The award pools provide the player with a chance of receiving awards from each award pool ranging from a minimum number of awards in a pool to a maximum number of awards in a pool wherein the lowest award preferably includes an award associated with at least one of the distributed awards.

To further enhance player excitement and entertainment, the present invention provides a modifier associated with the player's selection. If the player receives an award which is associated with the modifier, the player's total award is modified (i.e., such as doubled). The modifier increases the player's award total based on any suitable modifying factor. The player receives the modifier if the award associated with the modifier is distributed to the player's selection.

Other objects, features and advantages of the invention will be apparent from the following detailed disclosure, taken in conjunction with the accompanying sheets of drawings, or in like numerals referred to like parts, elements, components, steps and processes.

BRIEF DESCRIPTION OF THE FIGURES

FIG. 10A is a flow diagram illustrating a number of award pools utilized to determine the distribution of awards to the player selection as shown in FIG. 10; and FIGS. 10B to 10D are flow diagrams illustrating a probability table associated with the award pools of FIG. 10A.

DETAILED DESCRIPTION

Figure 1A:
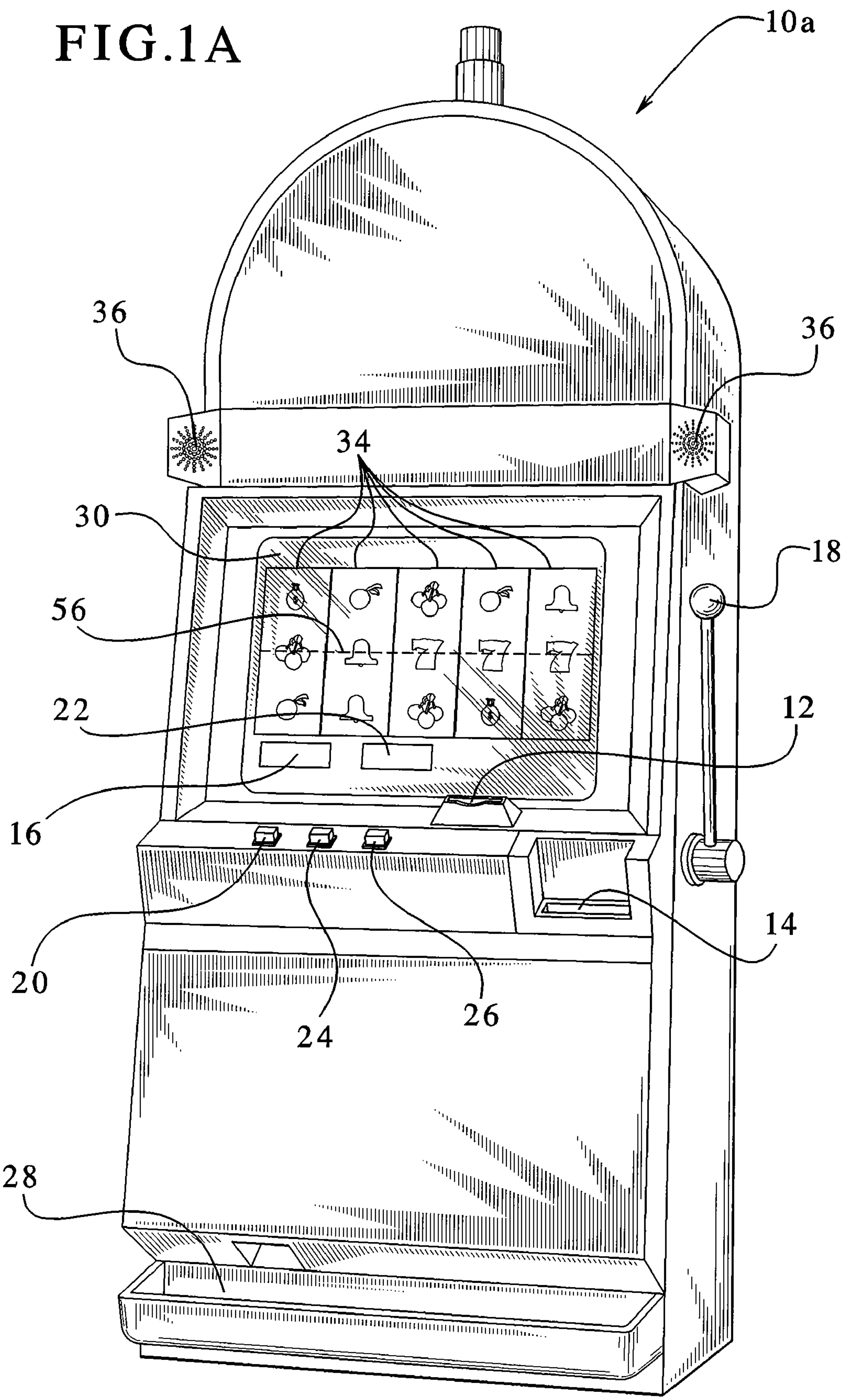
FIG. 1A is a perspective view of one embodiment of the gaming device of the present invention.
Figure 1B:
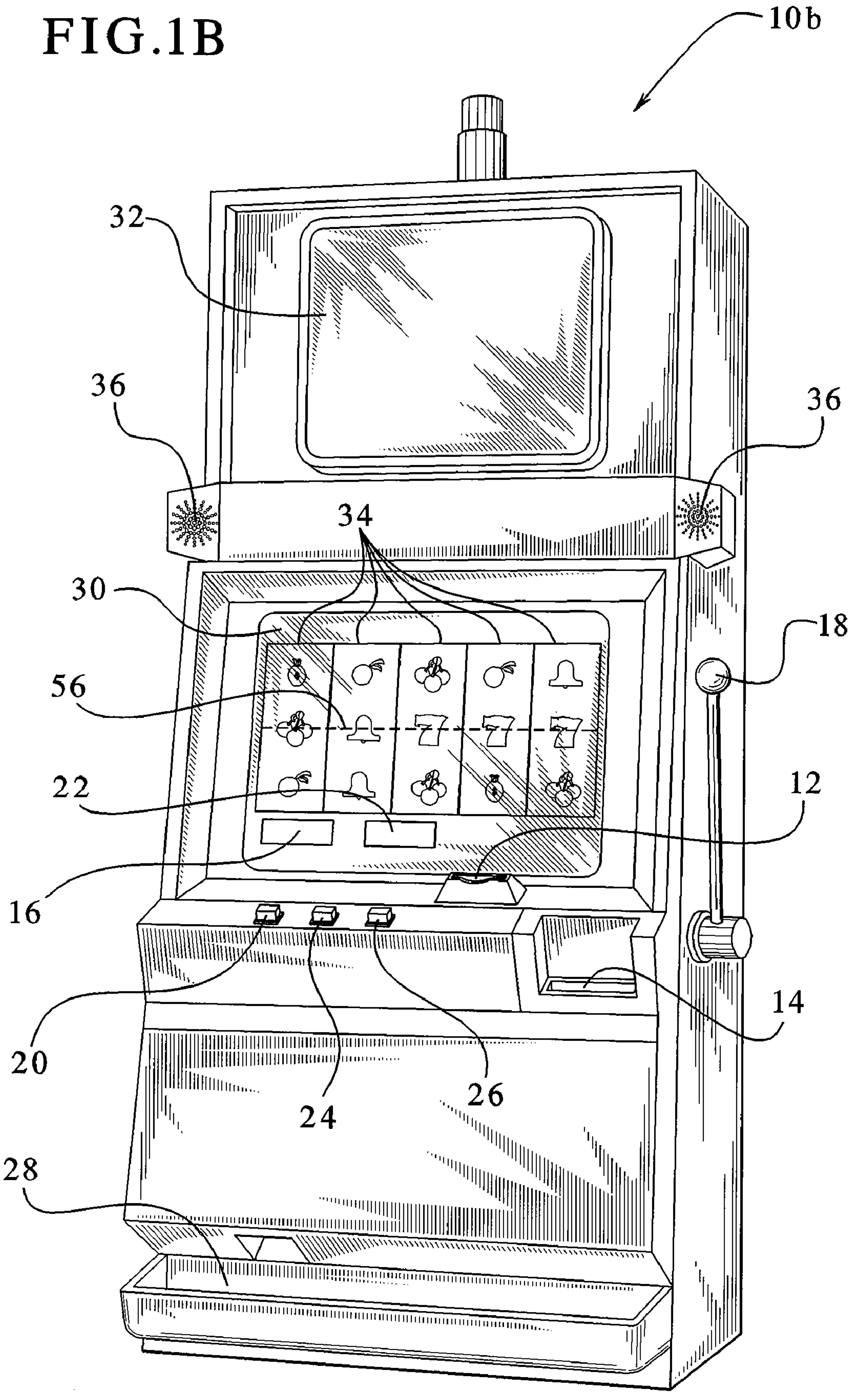
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
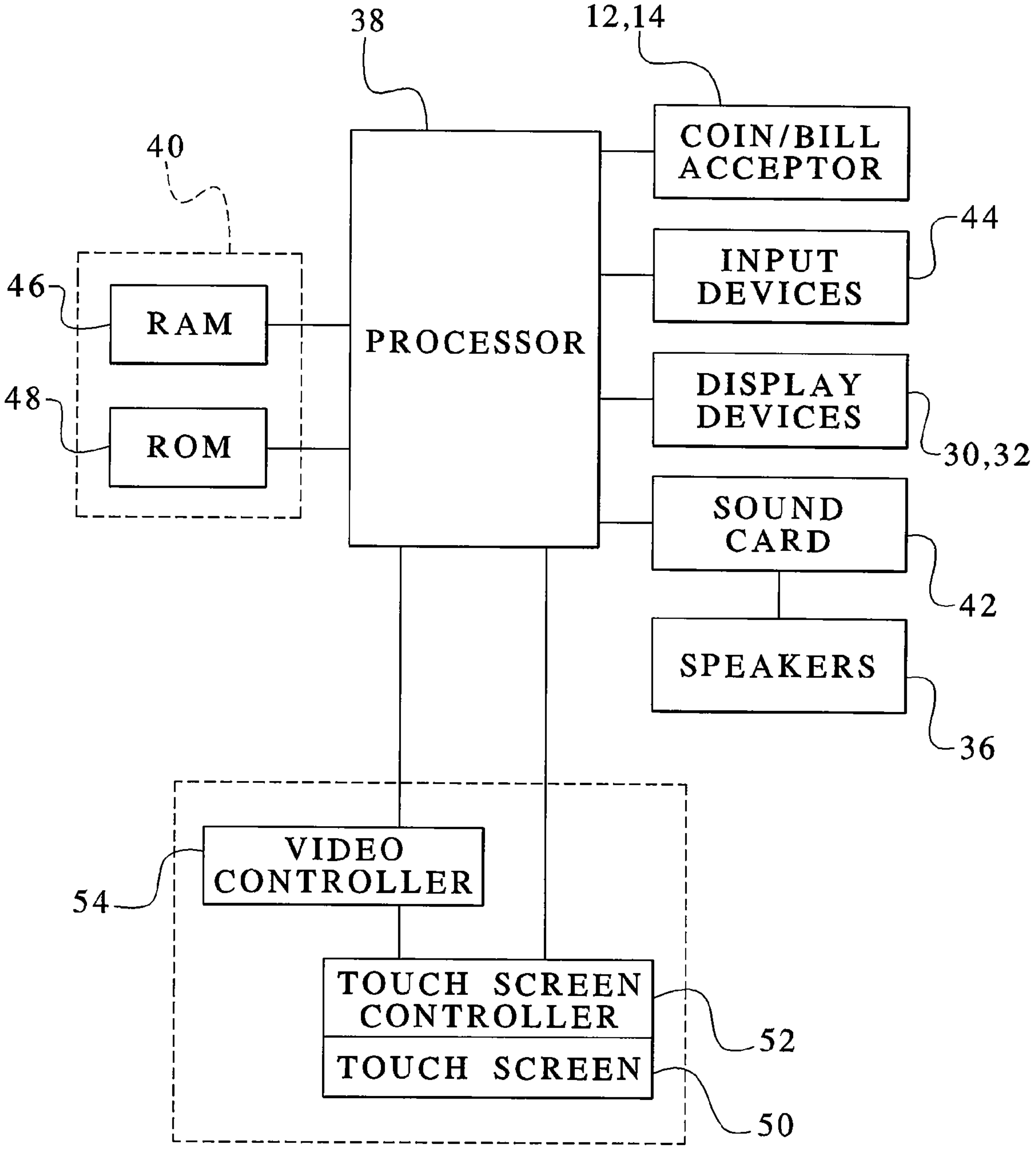
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

BONUS SCHEME

If a player achieves a bonus triggering or qualifying condition while playing the game, the gaming device 10 automatically begins the bonus round of the present invention. At the beginning of the bonus round, the game exhibits or displays one or more symbols, sounds, indicators, selections, visual or audio representations or other graphical representations. The bonus scheme may involve a variety of game scenarios which involve awarding bonus values to a player upon the occurrence of certain events. The computer of the gaming device determines what a game exhibits or displays, game scenarios, the object of the game, how the game is played and the various events which occur in the game.

Figure 3:
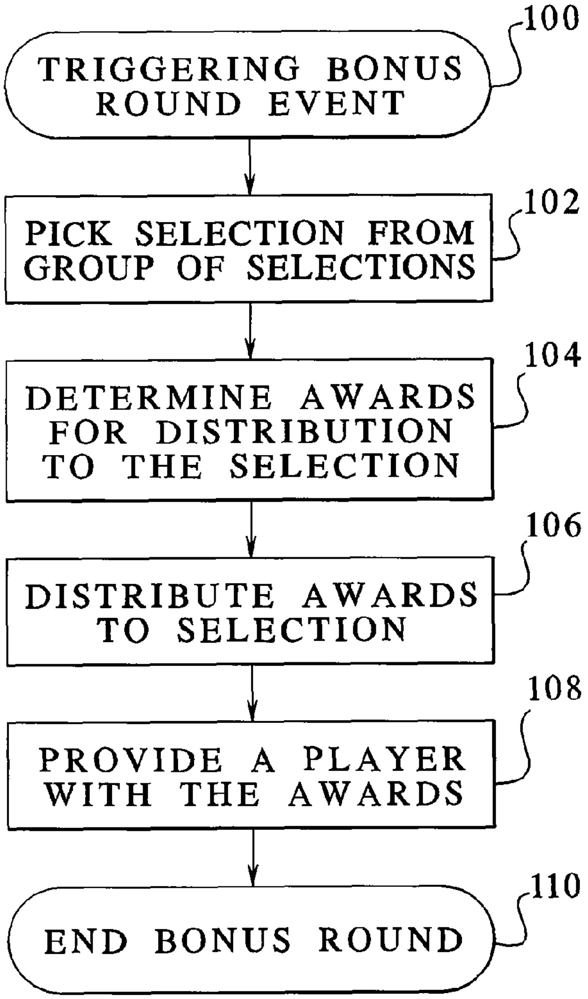
FIG. 3 is a flow diagram of one embodiment of the present invention.

As illustrated in FIG. 3, the bonus scheme begins by the triggering of a bonus round event as indicated by circle 100. For example, the bonus round triggering event includes a player who depresses a start button. However, the present invention is not limited to this type of bonus triggering event and can include a variety of known player and game activated triggering events.

The bonus round preferably proceeds with the player picking or choosing a selection in a group of selections or selection groups as indicated by block 102. However, the picking of the selection, preferably the player selection, can be conducted in a variety of known player and game activated ways. The game determines the awards, preferably in a group of awards (i.e., an award group), which are to be distributed to the player selection as indicated by blocks 104 and 106. The game provides a player with the awards as indicated by block 108. Thereafter, the bonus round ends as indicated by circle 110.

The present invention preferably utilizes a number of award pools for determining the awards for distribution to the player selection as illustrated in FIGS. 3A to 3D. The award pools preferably have a predetermined number of awards as indicated by block 112 and as further illustrated in FIGS. 3A to 3D. However, the awards pools are not limited to having the predetermined number of awards and thus can include any suitable number of awards.

The awards are assigned to the award pools based on the predetermined number of awards associated with the award pools as indicated by block 114 and as further illustrated in FIGS. 3A to 3D.

Figure 3A:
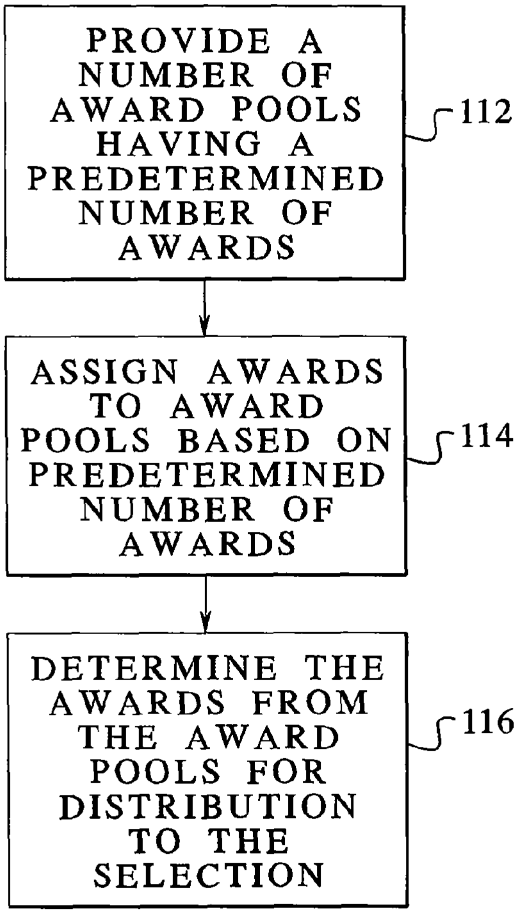
FIG. 3A to 3D are flow diagrams of the determination step of FIG. 3 utilizing a number of award pools and illustrating various steps for determining the distributed awards.
Figure 3B:
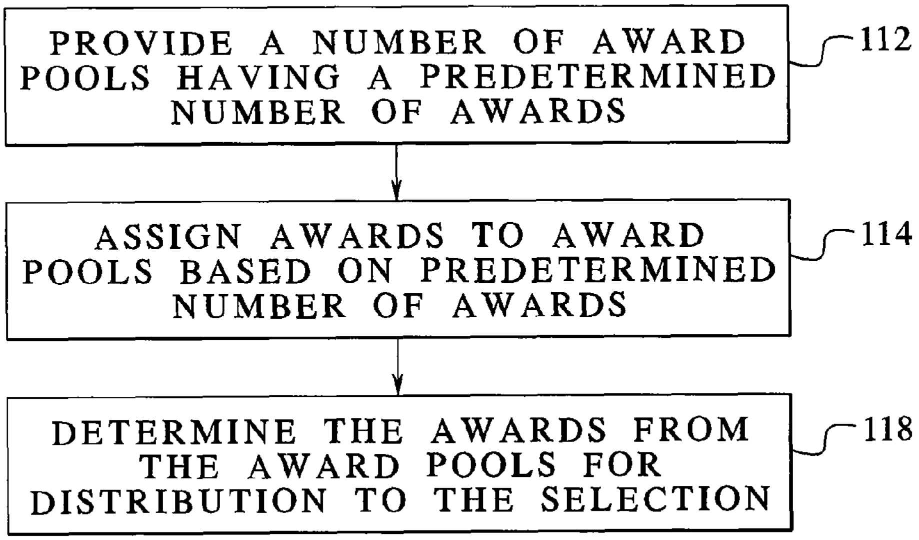

As shown in FIG. 3A, the game determines the awards from the award pools for distribution to the player selection as indicated by block 116. As shown in FIG. 3B, the determination step is preferably based on an outcome derived from a probability table associated with each award pool as indicated by block 118.

Figure 3C:
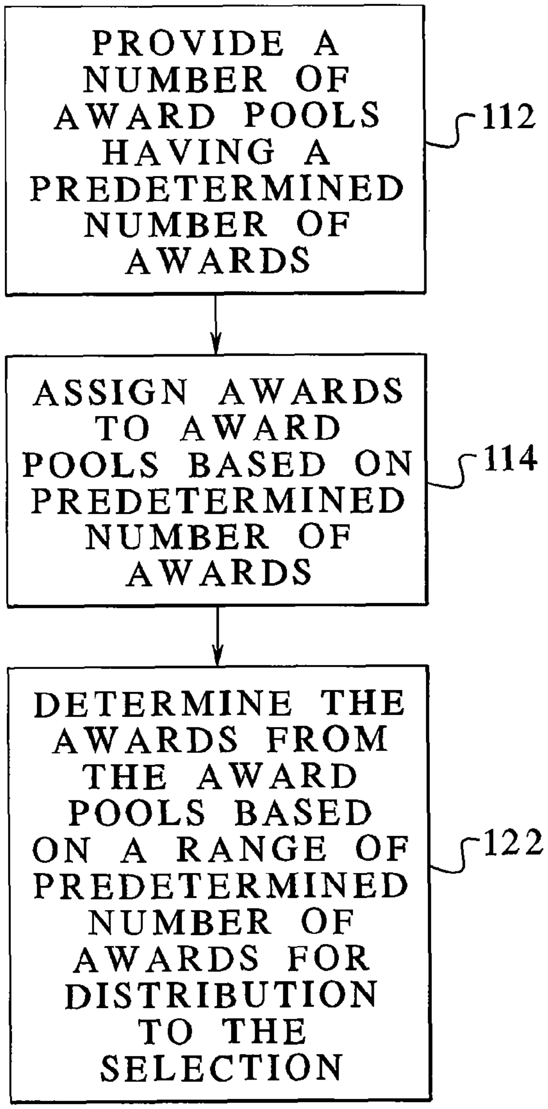
Figure 3D:
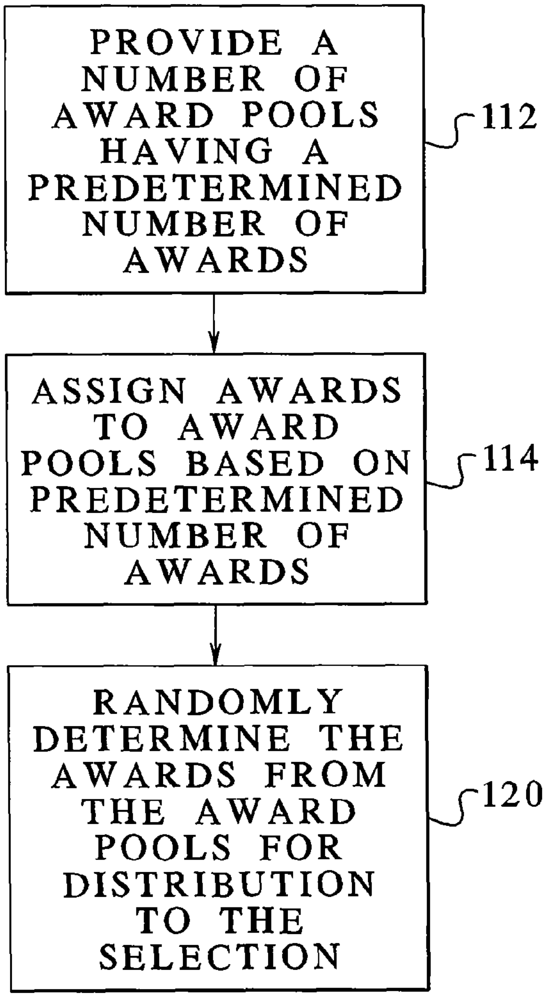

However, the present invention is not limited to this determination step and can include a variety of other determination steps. For example, the game can randomly determine the awards from the award pools for distribution to the player selection as indicated by block 120 and illustrated in FIG. 3D. As shown in FIG. 3C, the game determines the awards from the award pools based on a range of the predetermined number of awards associated with the award pools for distribution to the player selection as indicated by block 122.

Figure 4:
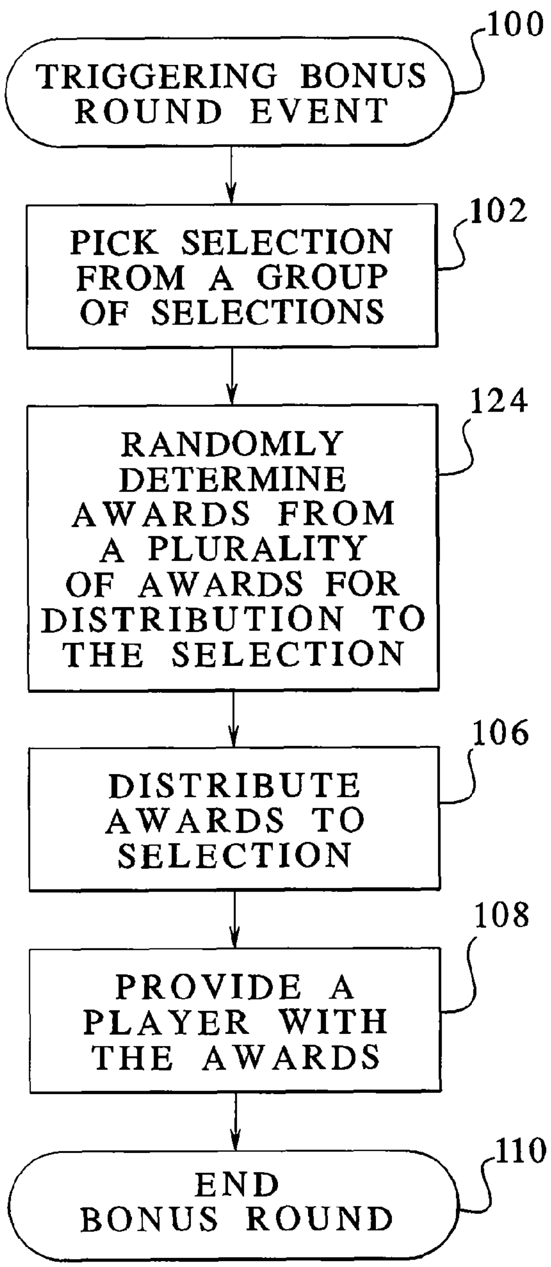
FIGS. 4 to 7 are flow diagrams of alternative embodiments of the present invention.
Figure 5:
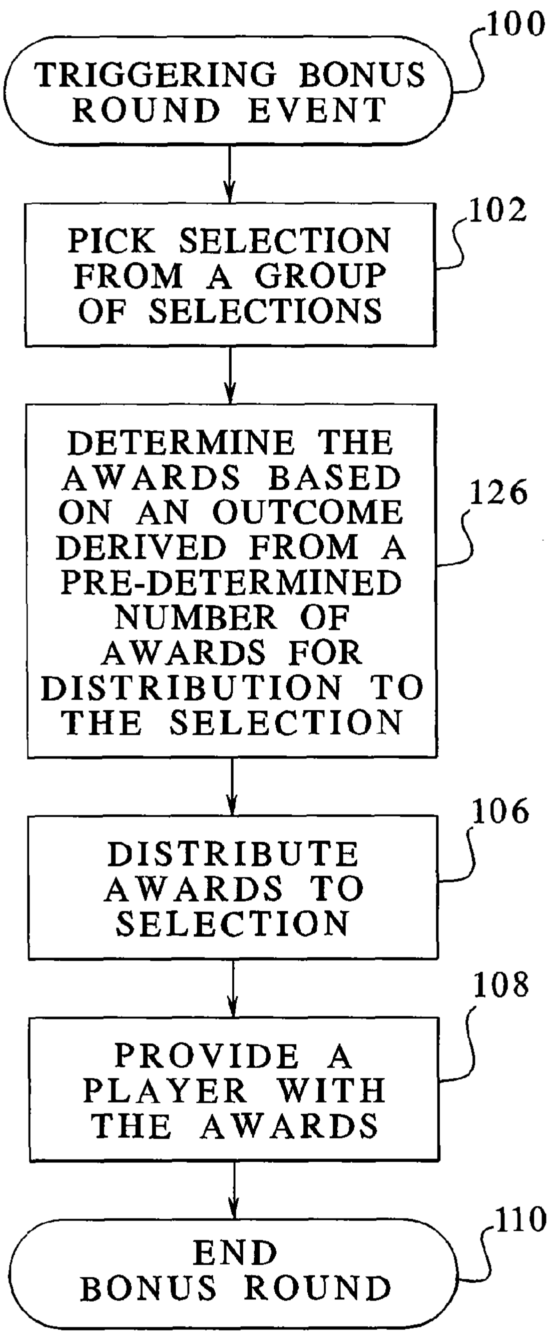

The present invention is not limited to utilizing the award pools for determining the awards for distribution to the player selection. For example, the game can randomly determine awards from a plurality of awards for distribution to the player selection as indicated by block 124 and illustrated in FIG. 4. As shown in FIG. 5, the game can determine the awards from a plurality of awards for distribution based on an outcome derived from a predetermined number of awards associated with the plurality of awards as indicated by block 126.

Figure 6:
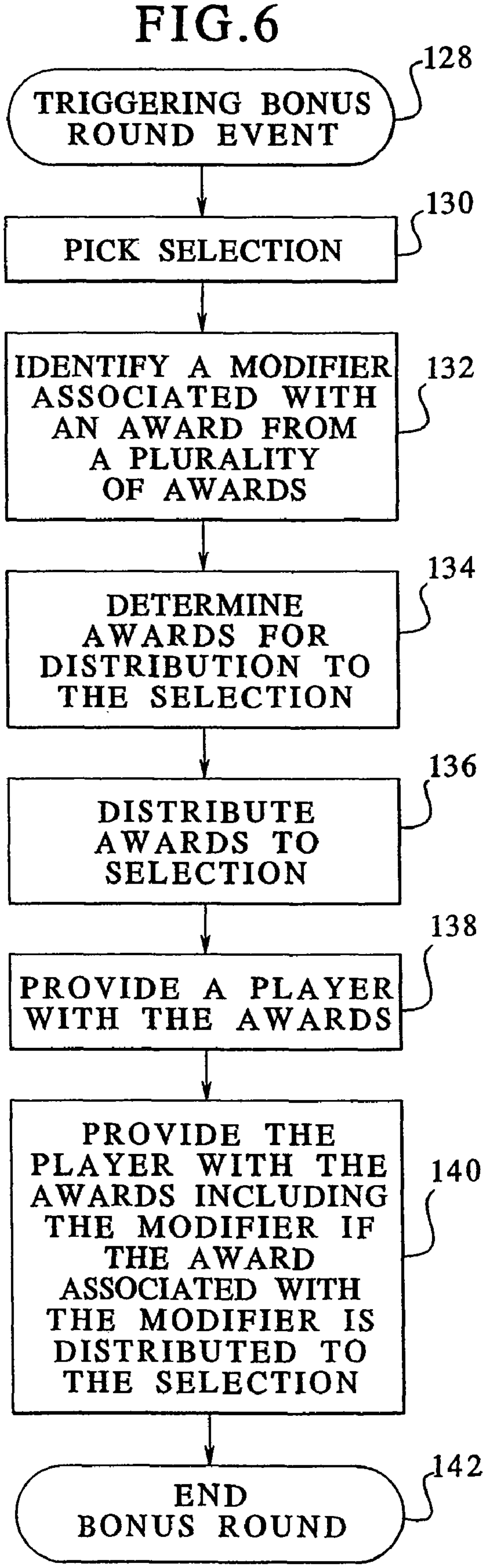

In order to create more excitement and entertainment for the player, the bonus scheme can include a variety of sequencing of events. For example, the triggering of a bonus round event and the picking of the player selection occur as indicated by circle 128 and box 130 of FIG. 6. The game identifies a modifier associated with an award from a plurality of awards as indicated by block 132. The game determines the awards for distribution to the player selection as indicated by block 134. The awards are distributed to the player selection and a player award is provided with the awards as indicated by blocks 136 and 138. The game provides the player with the awards including the modifier if the awards distributed to the selection include the modifier as further indicated by block 140. However, the present invention is not limited to this particular sequence for providing awards including the modifier, and thus, the game can provide awards including the modifier based on a variety of suitable sequences. Thereafter, the bonus round ends as indicated by block 142.

Figure 7:
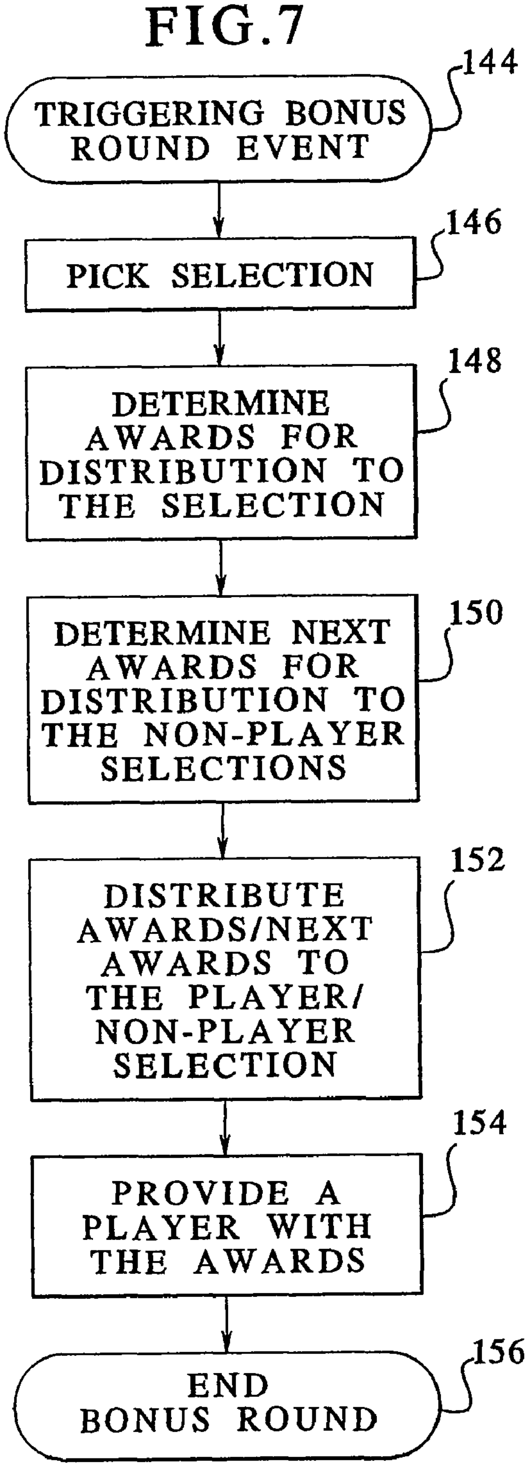

In an alternative embodiment as shown in FIG. 7, the bonus round begins with a triggering event as indicated by circle 144. The player preferably picks or chooses a player selection from a group of selections (i.e., a selection group) as indicated by block 146. The game determines the awards from a plurality of awards for distribution to the player selection as indicated by block 148. The game continues by determining the next awards from the plurality of awards for distribution to a plurality of the non-player selections (i.e., the selections other than the player selection) from the selection group as indicated by block 150. The awards are distributed to the player and non-player selections as further indicated by block 152. The game provides a player with the awards distributed to the player selection as indicated by block 154. Thereafter, the bonus round ends as indicated by circle 156.

It should be appreciated that the present invention is not limited to a specific configuration. The components of the bonus scheme, such as the selections (i.e., player and non-player selections), awards, award pools and probability tables, can include a variety of different configurations and constructions.

Figure 8:
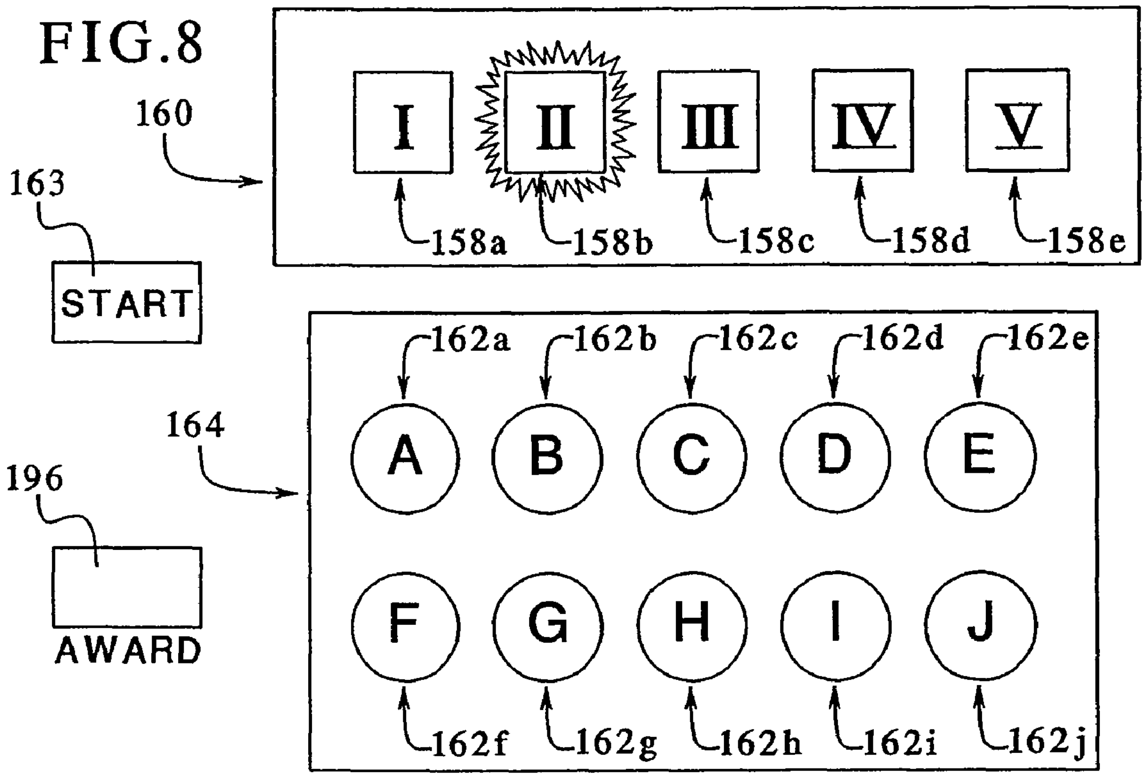
FIG. 8 is a top plan view of an embodiment of the bonus scheme illustrating the player selection.

In one preferred embodiment, the bonus round includes a number of selections 158*a* to 158*e* (collectively referred to as 158) in a group of selections (i.e., selection group) 160 and a number of awards 162*a* to 162*j* (collectively referred to as 162) in a group of awards (i.e., an award group) 164 as illustrated in FIG. 8. The selection group 160 preferably includes five selections 158 labeled "I" to "V" for illustrative purposes. The selections can include a variety of different configurations. For example, the selections preferably include symbols that represent a number of individuals who are beneficiaries to a will. However, the symbols associated with the selections can include a variety of different symbols, such as number symbols, letter symbols, graphical representations or other like symbols.

The awards 162 in the award group 164 are preferably masked or not revealed. However, the awards can be revealed or unmasked at any suitable time and in any suitable configuration during the game. One embodiment of the present invention includes ten awards 162 associated with an award symbol labeled as "A" to "J" for illustrative purposes. The award symbols associated with the awards 162 include a number of graphical representations illustrating various types of property for distribution to a number of beneficiaries of a will. However, the award symbols associated with the awards 162 can include a variety of different symbols, such as number, letter, graphical and other like symbols.

It should be appreciated that the present invention is not limited to the number, type, or configuration of the selections and awards (i.e., the number of selections and awards is not limited to five and ten, respectively).

The player (not shown) is associated with one of the selections 158 (i.e., the beneficiaries) by picking or choosing one of the selections 158 after the bonus round begins, for example when the player depresses the start button 163. As shown in FIG. 8, the game distinguishes the player selection 158*b* (i.e., the selection picked by the player) by highlighting it in a color (not shown) that is different than the other selections or non-player selections, namely, 158a, 158c, 158d and 158e, or by identifying it in some other known audio, visual or other like way.

Figure 9:
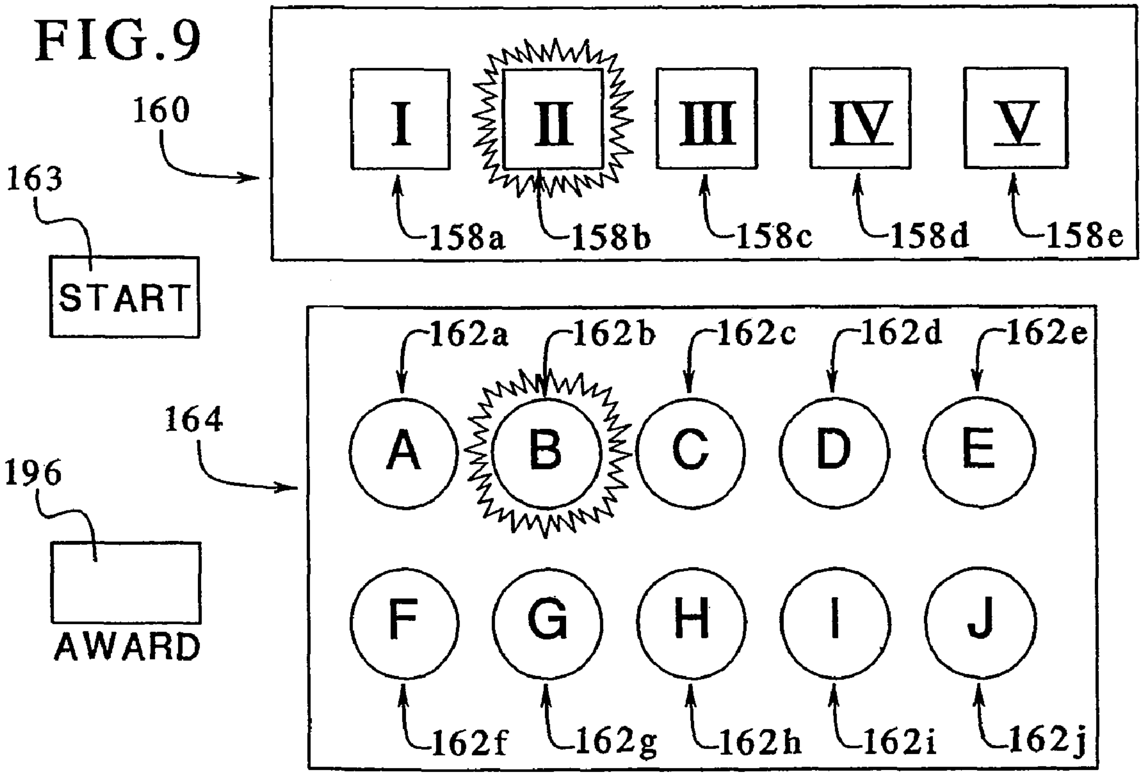
FIG. 9 is a top plan view of the bonus scheme of FIG. 8 illustrating the identification of a modifier associated with an award in a group of awards.

The game identifies an award 162b in the award group 164 as illustrated in FIG. 9. The identified award 162b is associated with a modifier (not shown) which enables the player to have an increased award if a certain event occurs as described in detail below. The modifier is preferably masked or not revealed. However, the modifier can be unmasked or revealed at any suitable time during the game and in any suitable manner. The identified award 162b is preferably designated by an audio mechanism. However, the identified award 162b can be designated in other like audio and/or visual ways in order to enhance player excitement and entertainment.

Figure 10:
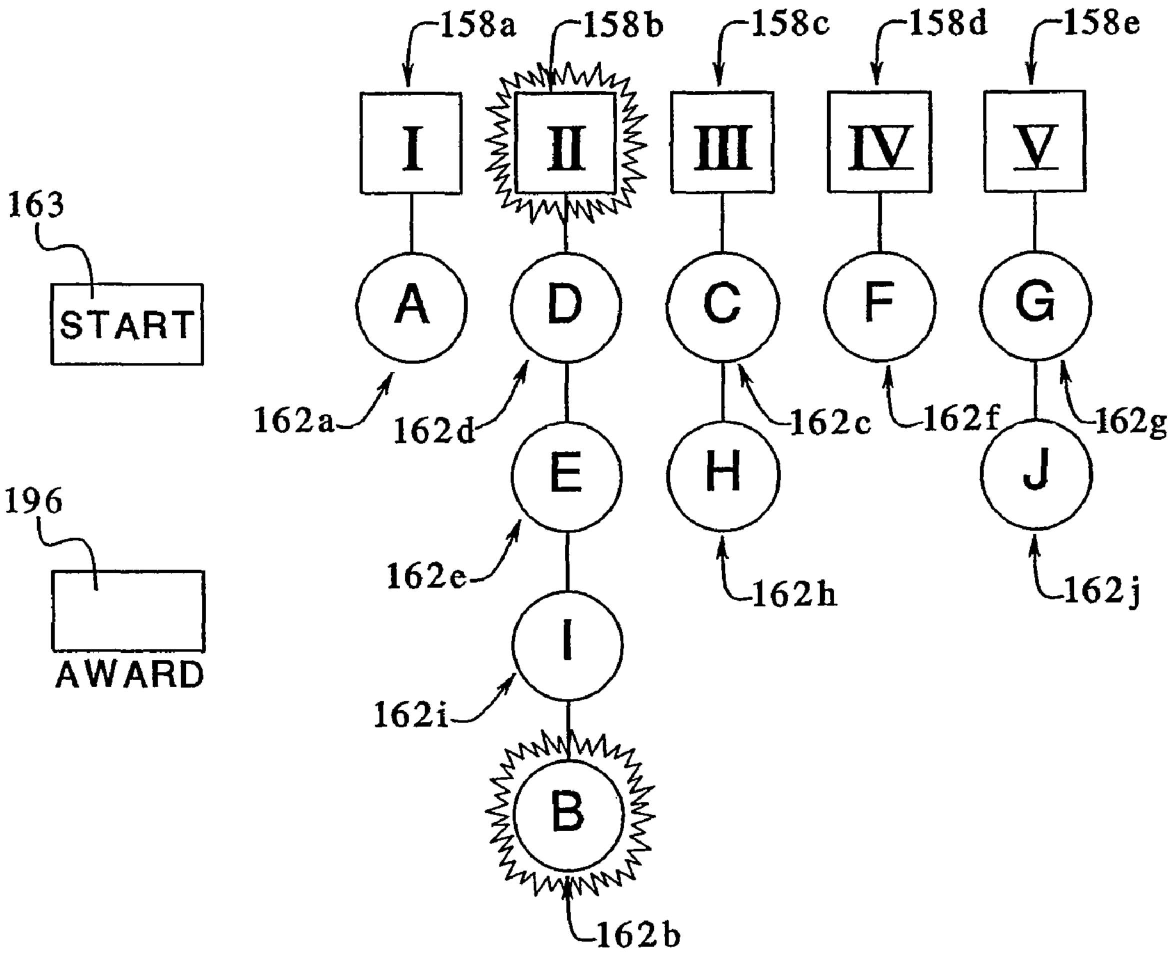
FIG. 10 is a top plan view of the bonus scheme of FIG. 8 illustrating the distribution of awards to player and non-player selections.

As discussed above, the game determines how the awards 162 (i.e., the property of the will) are distributed to the selections 158 (i.e., the beneficiaries of the will). Once determined, the game distributes the awards 162 to the selections 158 as illustrated in FIG. 10 and described in detail below. Prior to distributing the awards 162, the game preferably determines the awards 162 for distribution to the player selection 158b by utilizing a number of award pools as shown in FIG. 10A.

For example, the award pools preferably include a first, second and third award pool as illustrated by blocks 166, 168 and 170, respectively. Each of the award pools includes a predetermined number of awards for distribution to the player selection as indicated by blocks 172, 172a, 172b and 172c. The awards 162 in the award group 164 are assigned to the award pools based on the number of predetermined awards as indicated by blocks 174, 174a, 174b and 174c.

As indicated by blocks 176, 176a, 176b and 176c, the award pools include a number range of awards for distribution, that is, the minimum and maximum number of awards to be distributed from the award pools. For example, the first award pool has a range of "2" to "4" as indicated by block 176a, that is, the minimum number of awards for distribution is two and the maximum number of awards for distribution from this award pool is four.

The award pools also include a range of awards associated with each of the award pools as indicated by blocks 178, 178a, 178b and 178c. For example, the award range by block 178a associated with the first award pool ranges from "2" to "10". The awards represent a nominal award value associated with the awards of each of the award pools, that is, the minimum award from the first award pool is two and the maximum award from the first award pool is ten.

As further illustrated in FIG. 10A, the award pools determine the number of awards for distribution to the player selection as indicated by blocks 180, 180a, 180b and 180c. The first award pool includes two awards associated with symbols labeled "D" and "E" as indicated by block 180a. The award pools include an award associated with the distributed awards as shown by blocks 182, 182a, 182b and 182c. The award associated with the first award pool is "4" as indicated by block 182a, that is, the cumulative or total of values associated the awards labeled "D" and "E". The second award pool includes one award associated with a symbol labeled "I" having an award totaling "20" as indicated by blocks 180b and 182b. The third award pool includes one award for distribution, namely, the award labeled "B" having an award of "30" as indicated by blocks 180c and 182c.

It should be appreciated that the award pools of FIG. 10A are configured for illustrative purposes. The award pools can be configured in a variety of different ways. For example, the award pools can include any number of award pools containing a variety of different predetermined number of awards, range of awards, the number range of awards and other like award pool conditions or parameters.

The number of awards determined for distribution to the player selection is preferably based on an outcome derived from a probability table associated with the award pools as illustrated in FIGS. 10B to 10D. Alternatively, this number of awards can be randomly determined.

As shown in FIGS. 10B to 10D, the probability tables associated with each of the award pools includes a distribution probability associated with the possible number of awards for distribution. The number of awards for distribution and its respective distribution probability are indicated by blocks 184 to 184c and 186 to 186c for the first award pool as shown in FIG. 10B, by blocks 188 to 188d and 190 to 190d for the second award pool as shown in FIG. 10C and by blocks 192 to 192c and 194 to 194c for the third award pool as shown in FIG. 10D.

In particular, the first award pool includes a distribution probability of 40% for two awards as indicated by blocks 184a and 186a, that is, there is a 40% chance that the first award pool will include two awards for distribution as shown in FIG. 10B. Likewise, the first award pool includes a 30% chance of having three and four awards for distribution as indicated by blocks 184b, 184c, 186b and 186c.

Turning to FIG. 10C, the second award pool has a 20% distribution chance for one award as indicated by blocks 188a and 190a, a 50% distribution chance for two awards as indicated by blocks 188b and 190b, a 20% chance for three awards as indicated by blocks 188c and 190c, and a 10% chance for four awards as indicated by blocks 188d and 190d. As shown in FIG. 10D, the third award pool includes a 50% chance for distributing zero awards as indicated by blocks 192a and 194a, a 25% chance for distributing one award as indicated by blocks 192b and 194b and a 25% chance for distributing two awards as indicated by blocks 192c and 194c.

Referring to FIGS. 10 to 10D, the probability that the awards associated with the symbols labeled "D", "E", "I" and "B" would be distributed to the player selection 158b is 0.02 or 2%, that is, the probability of distributing two awards associated with the first award pool (i.e. 40% as indicated by block 186a as shown in FIG. 10B) multiplied by the probability of distributing one award associated with the second award pool (i.e., 20% as indicated by block 190a as shown in FIG. 10C) multiplied by the probability of distributing one award associated with the third award pool (i.e., 25% as indicated by block 194b as shown in FIG. 10D).

Once the game determines the awards 162 for distribution, the awards 162 are distributed to the player selection 158b. As shown in FIG. 10, the player selection 158b associated with the symbol labeled "II" includes four awards distributed thereto, namely, the awards associated with the symbols labeled "D", "E", "I", and "B", based on the award pool determinations as previously discussed. The remaining awards, namely, the awards associated with the symbols labeled "A", "C", "H", "F", "G", and "J", are distributed to the non-player selections, namely, 158a, 158c, 158d and 158e. The awards 162 are randomly distributed to the player selection 158b and the non-player selections 158a, 158c, 158d and 158e, that is, the awards 162 are generally distributed in any order (i.e., randomly) in order to create excitement for the player. However, the award 162b associated with the modifier is preferably distributed last in the sequence of award distributions in order to enhance the excitement of the game.

As shown in FIG. 10, the award 162b associated with the symbol labeled "B" includes the modifier and is distributed to the player selection 158b. Therefore, the player's award associated with the award of the player selection 158b of "54" (not shown), that is, the cumulative total of the awards associated with the first, second and third award pools as previously discussed and further illustrated in FIG. 10A, is preferably increased by a multiplier factor associated with the modifier. The multiplier factor is preferably two. Therefore, the player's award is "108" as indicated in the bonus value award display 196. It should be appreciated that the modifier can include any suitable number of multiplier factors. The modifier can also include a variety of other modifiers. For example, the modifier can include the sum total of all of the awards 162.

It should be appreciated that the player's award is not limited to an award associated with a bonus value, that is an award that is added to the player's award total associated with regular game play (i.e., game play other than game play during the bonus round). For example, the player's award can include an award associated with a credit value that provides, for example, extended game play or an award associated with any other suitable game value.

While the present invention has been described in connection with what is presently considered to be the most practical and preferred embodiments, it is to be understood that the invention is not limited to the disclosed embodiment, but on the contrary is intended to cover various modifications and equivalent arrangements included within the spirit and scope of the claim. It is thus to be understood that modifications and variations in the present invention may be made without departing from the novel aspects of this invention as defined in the claims and that this application is to be limited only by the scope of the claims.

The invention is claimed as follows:

1. A method of randomly determining and displaying an award to be provided to a player of a gaming machine, said method comprising:

(a) receiving a wager to initiate a play of a game;

(b) after receiving the wager and after determining to provide the award to the player, causing a server remote from the gaming machine to make a first random determination for each occurrence of determining and displaying said award, said first random determination at least in part including a determination of at least one of a plurality of potential monetary values of the award to be provided;

(c) thereafter, causing a processor of the gaming machine to make a second, subsequent random determination for each occurrence of determining and displaying said award, said second random determination utilizing results of said first random determination to determine a monetary value of the award to be provided, said monetary value being greater than zero; and (d) thereafter, causing a display of the monetary value of the award to be provided.

2. The method of claim 1, wherein at least two of said potential monetary values are different.

3. The method of claim 1, wherein the first random determination includes a random determination of a quantity of said potential monetary values.

4. The method of claim 1, wherein the second random determination includes a random determination of a quantity of said potential monetary values.

5. The method of claim 1, wherein the first random determination includes a random determination of said plurality of potential monetary values.

6. The method of claim 1, wherein the second random determination includes a random determination of at least one of said potential monetary values.

7. The method of claim 1, wherein the first random determination includes a random determination of a quantity of said potential monetary values and a random determination of said plurality of potential monetary values.

8. The method of claim 1, wherein the first random determination includes a random determination of a quantity of said potential monetary values, and wherein the second random determination includes a random determination of at least one said potential monetary values.

9. The method of claim 1, wherein the first random determination includes a random determination of said plurality of potential monetary values, and wherein the second random determination includes a random determination of a quantity of said potential monetary values.

10. The method of claim 1, wherein the first random determination includes a random determination of a quantity of said potential monetary values distributed to each of a plurality of pools, and wherein the second random determination determines the monetary value of the award to be provided from said pools.

11. The method of claim 1, wherein the second random determination includes a random determination of a quantity of said potential monetary values distributed to each of a plurality of pools, and wherein the second random determination determines the monetary value of the award to be provided from said pools.

12. The method of claim 1, wherein the first random determination includes a random determination of said potential monetary values distributed to each of a plurality of pools, and wherein the second random determination determines the monetary value of the award to be provided from said pools.

13. The method of claim 1, wherein the second random determination includes a random determination of said potential monetary values distributed to each of a plurality of pools, and wherein the second random determination determines the monetary value of the award to be provided from said pools.

14. The method of claim 1, wherein the first random determination includes a random determination of a quantity of said potential monetary values distributed to each of a plurality of pools and a random determination of said potential monetary values distributed to each of said plurality of pools, and wherein the second random determination determines the monetary value of the award to be provided from said pools.

15. The method of claim 1, wherein the first random determination includes a random determination of a quantity of said potential monetary values distributed to each of a plurality of pools, and wherein the second random determination includes a random determination of said potential monetary values distributed to each of said plurality of pools and the determination of the monetary value of the award to be provided from said pools.

16. The method of claim 1, wherein the first random determination includes a random determination of potential monetary values for distribution to each of a plurality of pools, and wherein the second random determination includes a random determination of a quantity of said potential monetary values distributed to each of said plurality of pools and the determination of the monetary value of the award to be provided from said pools.

17. A method of randomly determining and displaying an award to be provided to a player of a gaming machine, said method comprising:

(a) receiving a wager to initiate a play of a game;

(b) after receiving the wager and after determining to provide the award to the player, causing a server remote from the gaming machine to make a first random determination for each occurrence of determining and displaying said award, said first random determination including, at least in part, determining a quantity of potential monetary values of the award to be provided;

(c) thereafter, causing a processor of the gaming machine to make a second, subsequent random determination for each occurrence of determining and displaying said award, said second random determination utilizing results of said first monetary random determination to determine a monetary value of the award to be provided, said value being greater than zero; and (d) thereafter, causing a display of the monetary value of the award to be provided.

18. The method of claim 17, wherein the first random determination includes a random determination of said potential monetary values.

19. The method of claim 17, wherein the second random determination includes a random determination of said potential monetary values.

20. A method of randomly determining and displaying an award to be provided to a player of a gaming machine, said method comprising:

(a) receiving a wager to initiate a play of a game;

(b) after receiving the wager and after determining to provide the award to the player, causing a server remote from the gaming machine to make a first random determination for each occurrence of determining and displaying said award, said first random determination including, at least in part, determining a plurality of potential monetary values which are selectable to determine a monetary value of the award to be provided, wherein at least two of said potential monetary values are different;

(c) thereafter, causing a processor of the gaming machine to make a second, subsequent random determination for each occurrence of determining and displaying said award, said second random determination utilizing results of said first random determination to determine the monetary value of the award to be provided, said monetary value being greater than zero; and (d) thereafter, causing a display of the monetary value of the award to be provided.

21. The method of claim 20, wherein the second random determination includes a random determination of the quantity of said potential monetary values from which the monetary value of the award to be provided is selected.

22. A method of randomly determining and displaying an award to be provided to a player of a gaming machine, said method comprising:

(a) receiving a wager to initiate a play of a game;

(b) after receiving the wager and after determining to provide the award to the player, causing a server remote from the gaming machine to make a first random determination for each occurrence of determining and displaying said award, said first random determination at least in part including a determination of a range of a quantity of potential monetary values of the award to be provided;

(c) thereafter, causing a processor of the gaming machine to make a second, subsequent random determination for each occurrence of determining and displaying said award, said second random determination utilizing results of said first random determination to determine a monetary value of the award to be provided, said monetary value being greater than zero; and (d) thereafter, causing a display of the monetary value of the award to be provided.

23. A method of randomly determining and displaying an award to be provided to a player of a gaming machine, said method comprising:

(a) receiving a wager to initiate a play of a game;

(b) after receiving the wager and after determining to provide the award to the player, causing a server remote from the gaming machine to make a first random determination for each occurrence of determining and displaying said award, said first random determination at least in part including a determination of a range of potential monetary values of the award to be provided;

(c) thereafter, causing a processor of the gaming machine to make a second, subsequent random determination for each occurrence of determining and displaying said award, said second random determination utilizing results of said first random determination to determine a monetary value of the award to be provided, said monetary value being greater than zero; and (d) thereafter, causing a display of the monetary value of the award to be provided.

* * * * *

UNITED STATES PATENT AND TRADEMARK OFFICE

CERTIFICATE OF CORRECTION

PATENT NO. : 7,837,554 B2
APPLICATION NO. : 11/620381
DATED : November 23, 2010
INVENTOR(S) : Kaminkow eet al.

It is certified that error appears in the above-identified patent and that said Letters Patent is hereby corrected as shown below:

IN THE CLAIMS:

In Claim 1, Column 9, Lines 39 to 40; replace "determination at least in part including" with --determination, at least in part, including--.

In Claim 22, Column 12, Lines 9 to 10; replace "determination at least in part including" with --determination, at least in part, including--.

In Claim 23, Column 12, Lines 31 to 32; replace "determination at least in part including" with --determination, at least in part, including--.

Signed and Sealed this
First Day of February, 2011

David J. Kappos
*Director of the United States Patent and Trademark Office*